Patented June 12, 1951

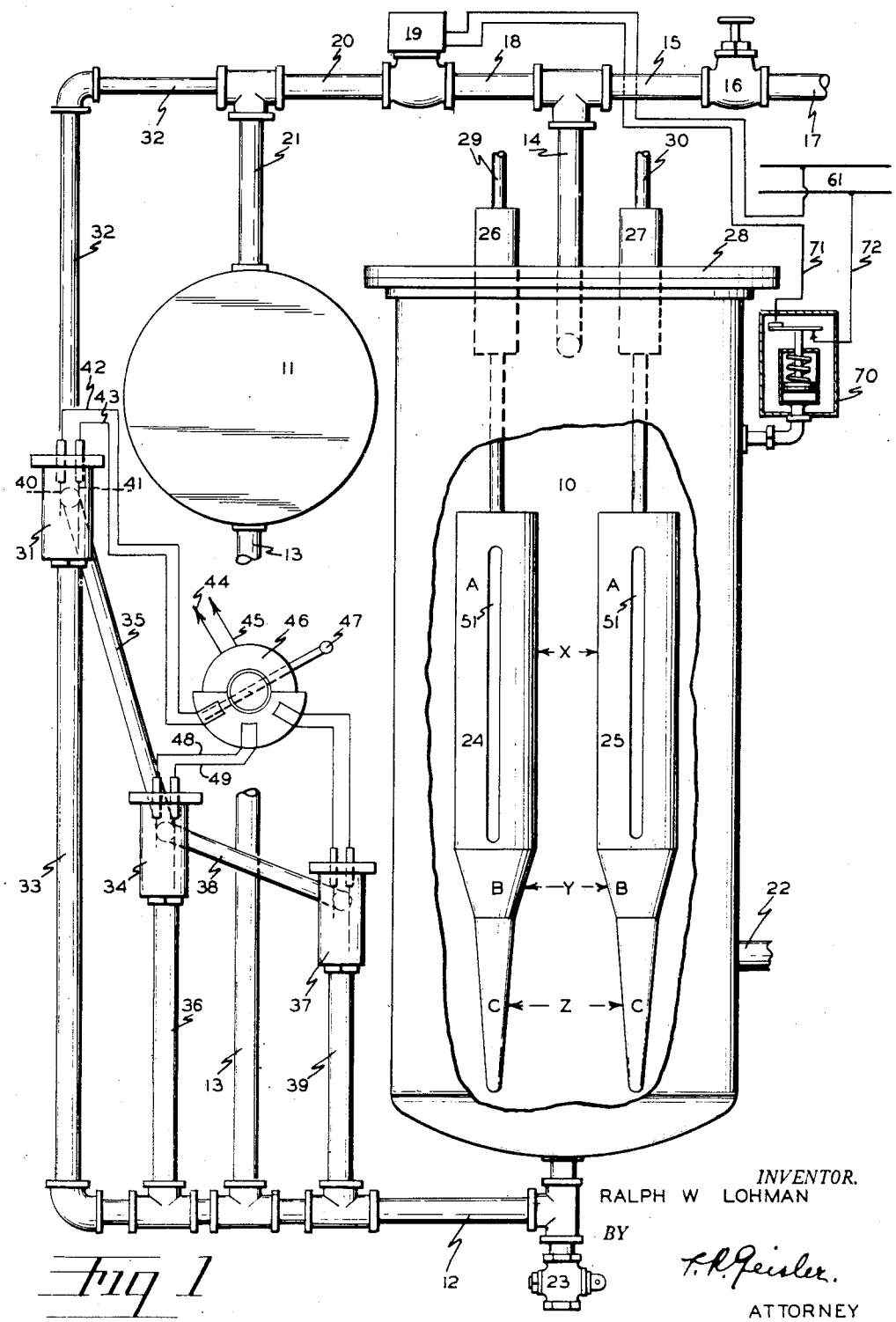

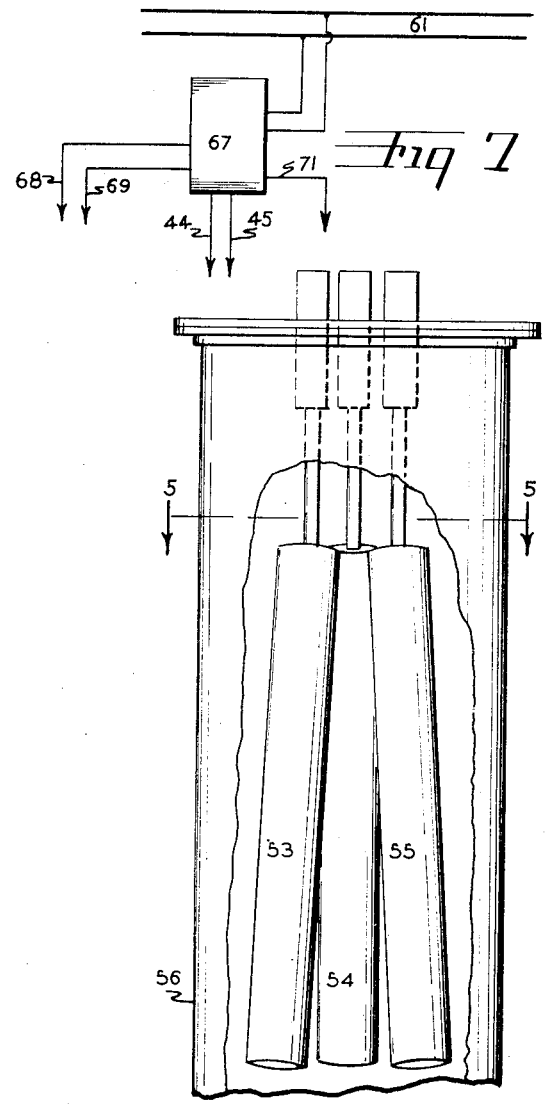
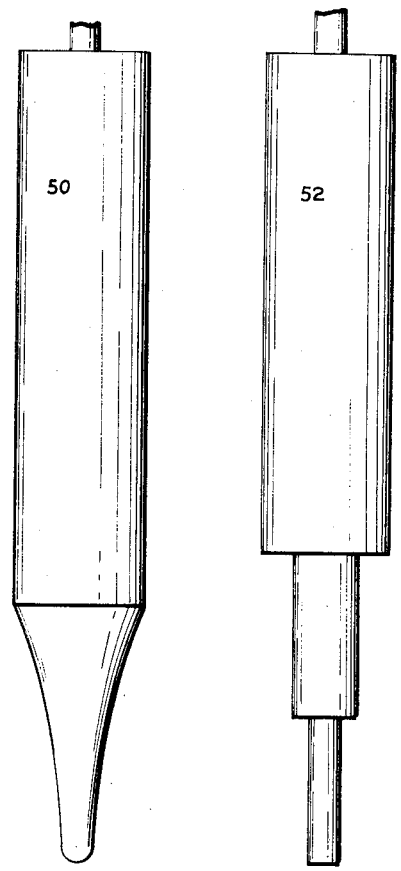
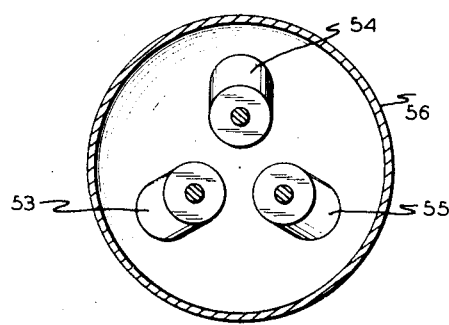
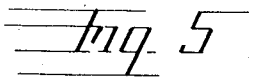

2,556,656

UNITED STATES PATENT OFFICE 2,556,656

ELECTRODE TYPE LIQUID HEATER AND STEAM GENERATOR

Ralph W. Lohman, Portland, Oreg.

Application November 8, 1948, Serial No. 58,903

6 Claims. (Cl. 219—40)

The present invention relates to electrode steam boilers and liquid heaters, and has for its purpose the provision of methods and apparatus for: (a) reducing the warm-up time of such boilers; (b) eliminating the electrical overloads which have heretofore accompanied the increasing conductivity of the boiler fluid with increasing temperature and concentration; (c) operating such boilers at a fixed or desired current-density on the electrodes, notwithstanding their fixed relative position, and the varying conductivity of the boiler water; and (d) operating the boilers at various, easily selectable, water-levels.

The invention is particularly applicable to that type of electrode boiler comprising a generating section, in which the electrodes are located, and a surge-tank or control section. In the generating section the normal water-level may be periodically and automatically depressed during operation, the water being thereby transferred into the surge-tank section, by means which will be more fully described hereinafter, thereby decreasing the immersion of the electrodes in the liquid, thus causing them to present less surface area thereto, correspondingly decreasing the current passing through the liquid, and, in consequence, reducing the rate of heating of the liquid or the generation of steam.

*Difficulties inherent in heretofore constructed electrode boilers*

Certain familiar difficulties are encountered in the operation of electrode steam boilers, and these difficulties arise as a result of the following factors:

1. The electrical conductivity of the contained liquid or water increases with its rise in temperature.

2. The electrical conductivity of the water also increases very materially with the accumulations of salts and other impurities in the water.

When the electrodes are so constructed and arranged that, with maximum immersion, full load current will be taken by the boiler when it is full of cold water or liquid, the electrical input, when the temperature rises from say 20° to 100° C., will be from three to five times that of the initial load (depending upon the composition of the boiler water), thus seriously overloading the power supply system.

On the other hand, if the surface area, spacing and immersion of the electrodes are so arranged that the desired full load current will not be taken until the boiler initially reaches its designed temperature and pressure (that is, before concentration takes place), then the average input during such "warm-up" period will be only a fraction of the full load current. For example, a boiler taking a normal hot load of say 50 kw., will only take an initial load of say 5–8 kw. when cold, and, as a result, by actual test, an interval as long as two or more hours may be required to reach full steaming capacity—an undesirable condition.

Furthermore, if the surface area, spacing and immersion of the electrodes are so arranged that the desired full load current will be taken when the operating pressure and temperature are thus initially attained, then such electrical input may reach several hundred percent of its initial value after a few hours of operation, as the result of increasing concentration of the various salts in the boiler water, and the consequent increase in the conductivity thereof. Such a condition also produces untenable overloads on the supply system.

The conventional surge-tank-electrode type of boiler has heretofore not succeeded in meeting these difficulties. It might be thought that the increased conductivity of the water, tending to result in a more rapid generation of steam and corresponding increase in boiler pressure, would, in the surge-tank-electrode boiler, merely cause the water level to be forced lower and less electrode surface to be covered so that the increased conductivity of the water would be off-set by the reduced electrode submergence. However, the problem is more complicated, and the mere lowering of the water level under such conditions, in the manner in which the surge-tank-electrode boilers have heretofore been designed to operate, does not solve the difficulty. For instance, when the lowering of the water-level in the boiler, and thus the forcing of some of the boiler water into the surge-tank, is controlled by pressure switch and solenoid valve means which are set for definite maximum steam pressure, the production of boiler steam with less and less electrode immersion will finally reach a point where the pressure will have become less than that for which the valve has been set. Thereupon the valve control, momentarily permitting the return of water from the surge-tank to the boiler, will immediately cause an excessive current overload. This is particularly true when the water has considerably increased in conductivity. More important still is the fact that with the increased conductivity of water the density of the current on the immersed electrode surfaces (when conventional electrodes located at a constant fixed distance apart throughout their extent and maintained at a fixed voltage are used), will increase, and excessive and irregular formation of steam bubbles on these surfaces may ultimately form an insulating steam sheath acting temporarily to cut off the current passing between the electrodes and temporarily killing the boiler. When the current is cut off in this manner the steam sheath will of course condense, whereupon the water will again contact the electrode surfaces, and operating pressure will again tend to be restored to the boiler, but in the meantime a violent current overload will have occurred and the cycle will be repeated.

*Improvements embodied in present invention*

Heretofore it has been customary to operate the electrode surge-tank type of boiler continuously at as nearly a single, fixed, water-level as possible, such level, in practice, being maintained by a water-level-control system holding the water within limits slightly above and slightly below the desired level, except of course, when the said level has been depressed by an excess in steam pressure over that provided for by the pressure switch and solenoid valve or equivalent device, in the pipe line leading from the top of the generating tube to the top of the surge-tank. I have found, however, that more stable and satisfactory operation of an electrode boiler, is possible, if the generation of steam in the boiler is caused to take place at selectable operating water-levels which are regulated and controlled either manually or automatically in accordance with the conductivity of the water.

An object of this invention accordingly is to provide an improved electrode steam boiler of the surge-tank type which can be operated at various water-levels, manually or automatically selected, to correspond to changes in the conductivity of the boiler water.

In electrode steam boilers of various types, as far as I have known, it has heretofore been universal practice to use electrodes which are of substantially uniform contour or diameter throughout their length and to mount the electrodes in such manner that the distance between the electrodes—thus the effective interfacial distance—will be the same at top and bottom. I have discovered however, that important advantages are obtained by the employment of boiler or heater electrodes which are so formed and arranged that the interfacial distances between the electrodes will increase, and are also so formed that the surface areas per unit of length, presented by the electrodes, will decrease, as the water-level in the boiler or heater is lowered.

Therefore another object of this invention is to provide improved electrodes for boilers and liquid heaters and/or an improved arrangement of electrodes, so that current will be caused to traverse an increasingly longer path as the conductivity of the liquid increases, as its level in the boiler or heater is lowered, and as the effective electrode surface area is reduced.

An additional object of this invention is to provide an improved surge-tank-electrode type of steam boiler which will be capable of longer periods of operation between "blow-downs," thus requiring less frequent "blow-downs" with their serious loss of heat, but in which, such longer periods of operation and increasing conductivity of the liquid, will not be accompanied by excessive formation of steam bubbles in contact with the electrode surfaces, or excessive current density on the electrodes, or excessive overload on the supply system.

The means by which such improvements are carried out and the specified objects attained, and the manner in which such improvements meet the difficulties hereinbefore referred to, will now be briefly described with reference to the accompanying drawings.

*Description and operation*

Referring to the drawings:

Fig. 1 is an elevation, more or less diagrammatic, and partly in section, of a surge-tank-electrode steam boiler system embodying my invention;

Figs. 2 and 3 are sample types, in elevation, of other specially formed electrodes which may be employed in carrying out my invention;

Fig. 4 is a fragmentary elevation illustrating how electrodes which are of uniform dimension throughout may nevertheless be specially arranged for carrying out my invention in part;

Fig. 5 is a plan section of the electrode arrangement of Fig. 4;

Fig. 7 is a wiring diagram of the circuits through the water-level control device with which the water-level chambers, indicated in Figs. 1 and 6, are connected.

Figure 6:
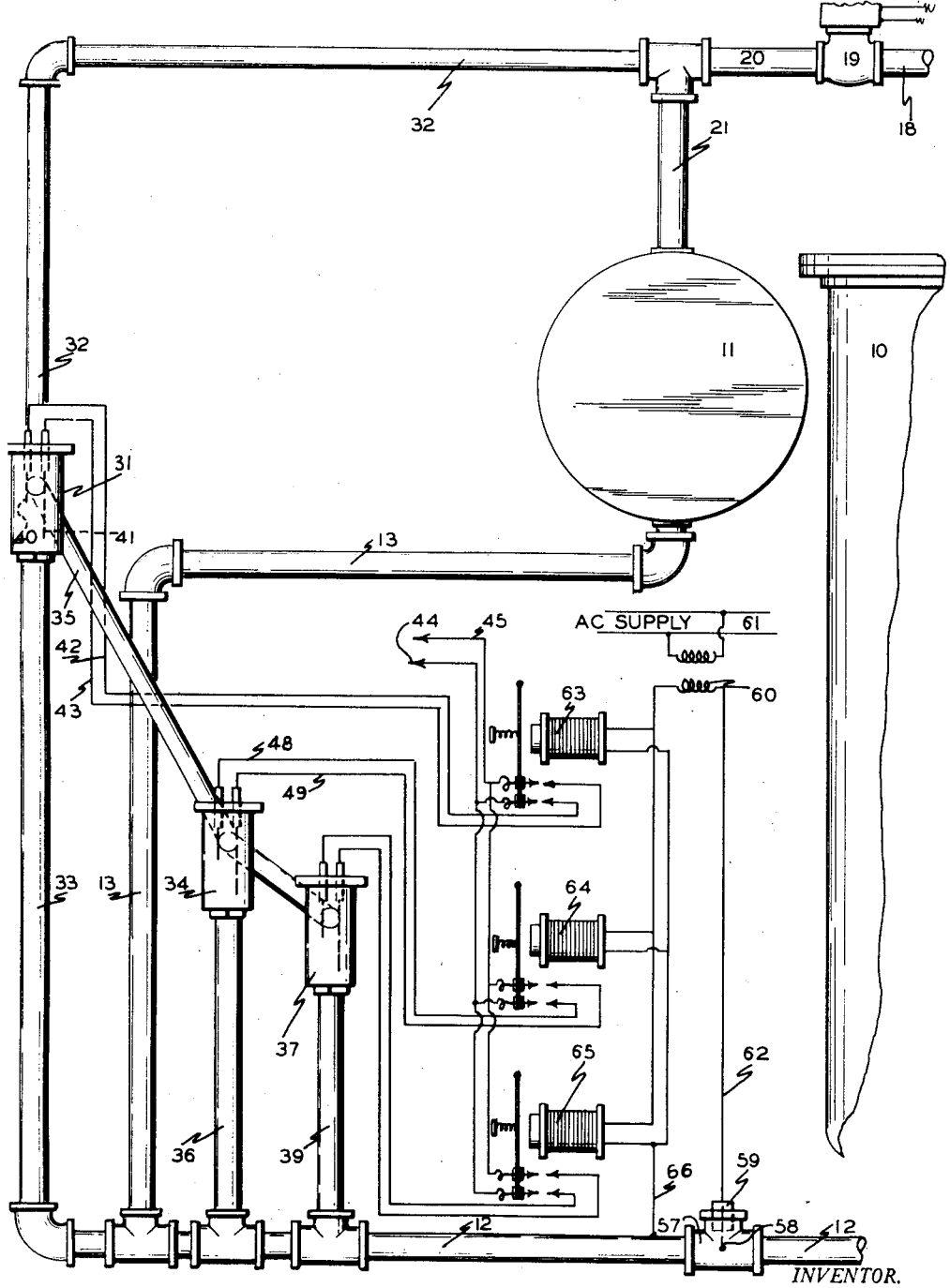
Fig. 6 is a fragmentary elevation and wiring diagram of an optional automatic water-level control which may be used in place of the manually operated control included in Fig. 1.

Referring first to Fig. 1, the generating tube is indicated by the reference character 10 and the customary surge-tank by the reference character 11. The lower end of the generating tube 10 is connected to the surge-tank by the pipes 12 and 13. Steam from the top of the generating tube passes into pipes 14 and 15 and, when the throttle valve 16 is opened, is delivered to the outlet pipe 17. Steam is also delivered through the branch pipe 18 to the inlet side of the solenoid valve 19, the outlet side of which is connected by the pipes 20 and 21 to the surge-tank 11. The opening and closing of the solenoid valve 19 is controlled by a pressure switch 70 which acts to cause the closing of the valve 19 when a predetermined steam pressure is produced in the generating tube 10, and to open it when the steam pressure falls below such value.

The operation of such a system is as follows: Assume that 150 pounds is the desired working pressure of the boiler. The pressure switch may be set at this value and will therefore keep the solenoid valve circuit 71—72, which is fed from the supply circuit 81, closed. Thus steam from generating tube 10 will have access through pipes 14, 18, 20 and 21, and through solenoid valve 19, to surge-tank 11, and therefore the water surface in these two vessels will remain at a common level.

If, however, the steam pressure in the generating tube 10 rises above 150 pounds the pressure switch 70 will open the solenoid valve circuit, the valve will close, and thus the steam pressure will somewhat exceed that in the surge-tank 11, the water in the generating tube 10 will be depressed and discharged through pipes 12 and 13 into the surge-tank 11, thus uncovering the electrodes, more or less, and thus preventing further rise of steam pressure.

If, subsequently, throttle 16 is opened, or some other action causes the steam pressure in generating tube 10 to fall, the pressure switch will close, the solenoid valve 19 will thereupon open, permitting equalization of steam pressure in the top part of the surge-tank with that in the generating tube, and water will therefore flow back from the surge-tank into the generating tube, reestablishing the previous common water-level, and thus the generation of steam.

Fresh water is supplied to the generating tube 10, when required, through an inlet pipe 22. A drain valve 23 connected with the bottom pipe 12 enables the water to be blown out of the system when desired.

The boiler water is heated by the passage of current through it from electrodes 24 and 25, two electrodes only, as in a single phase system, being shown for greater simplicity in the drawings, although ordinarily a three-phase system would be used as a source of supply, in which event three electrodes connected in Y would be employed, with the water and boiler shell acting as the neutral of the Y. The electrodes are supported by the insulators 26 and 27, respectively, and which insulators are secured in, and extend through, the top 28 of the generating tube 10. The conductors 29 and 30 for the electrodes 24 and 25 are connected to a suitable source of power (not shown).

A water-level chamber 31 is connected by the branch pipe 32 and the pipe 20 to the outlet side of the solenoid valve 19. The bottom of this water-level chamber is connected by the pipe 33 and the pipe 12 to the bottom of the generating tube 10.

A second water-level chamber 34, similar to water-level chamber 31, but positioned at a lower level, is connected to the chamber 31 by the pipe 35 and is connected with the generating tube 10 by the pipes 36 and 12.

Another similar water-level chamber 37, located at a still lower level, is connected to the second water-level chamber 34 by the pipe 38, and similarly is connected to the generating tube 10 by the pipes 39 and 12.

The water-level chamber 31 is provided with a pair of spaced electric probes 40 and 41, which extend to different depths in the chamber and are attached to conductors 42 and 43. These conductors 42 and 43 are connected to the wires 44 and 45 through the intermediary of the double pole, triple throw switch 46 which may be manually operated by the handle 47. The wires 44 and 45 are connected to a water-level control device 67 of standard construction which is diagrammatically indicated in Fig. 7, wire 71 being connected to the boiler piping. One commercial form of such water-level control device operates as follows (referring to Figs. 1 and 7): When water contacts the short probe rod 40 in the high water-level chamber 31, for example (the wires 42 and 43 being connected to the wires 44 and 45), current passes from one terminal of a transformer in the control device 67 (Fig. 7) through wire 44 (Fig. 1), the switch 46, and wire 42, to the short probe rod 40; thence from probe rod 40 to the water, from the water through the boiler piping to conductor 71 (Fig. 7) and thence to the other terminal of the transformer, thus causing a relay to open the circuit 68 and 69 (Fig. 7) to the pump motor (not shown), (the motor receiving its power from the A. C. supply 61). The opening of the pump motor circuit will cut off the supply of water through the inlet pipe 22, or it can be made to close a valve therein. On the other hand when the water in chamber 31 falls below the end of the long probe rod 41, current formerly flowing in the circuit of that probe—through one terminal of another transformer, through wire 45, the switch 46, and wire 43, to probe rod 41, thence to the water, through the boiler piping and conductor 71 back to this second transformer—is interrupted, and causes a relay, actuated by a spring, to close contacts in the pump motor circuit and thus start the pump. Since such a water-level control device is of standard construction it need not be further described.

Thus when the switch 46 is so set as to connect the conductor wires 42 and 43 from the water-level chamber 31 with the wires 44 and 45, the average, or mean, operating water-level of the boiler will be that which fluctuates between the levels of the respective ends of the long and short probe rods, except of course when steam pressure, exceeding that for which the pressure switch is set, forces water out of the generating tube 10 into the surge-tank 11, as hereinbefore explained.

When the switch 46 is turned so that the wires 44 and 45 are disconnected from wires 42 and 43, but are connected to wires 48 and 49, the second water-level chamber 34 becomes operative in place of chamber 31. As long as this second water-level chamber 34 is thus operatively connected, the delivery of water to the generating tube 10 will be caused to take place only when this is necessary in order to bring the adjusted operating water-level up to the average level of the respective ends of the long and short probe rods in the second chamber 34.

Similarly when the third or lowest water-level chamber 37 is operatively connected by the switch 46, the average operating water-level in the boiler will be maintained at the reduced level of this third or lowest chamber.

Thus, by properly positioning the switch 46, the average operating water-level in the boiler can be maintained at the particular average height desired. In other words, the water in the generating tube 10 will not be permitted to rise above the desired predetermined level for which the switch 46 is set. Thus, as the conductivity of the boiler water increases, the operating water-level can be correspondingly lowered and vice versa with all the attendant advantages above enumerated. The adjustment of the operating water-level to a plurality of successively lower operating levels as the boiler water develops increased conductivity is an important feature of my invention. The change of operating water-level from that of one water-level chamber to the next lower chamber will not take place of course until sufficient water has evaporated to make this difference possible, but this time lag I have found to be desirable in actual operation of the boiler.

Automatic control of the desired operating water-level in the boiler can be substituted for the manually operated control provided by the switch 46, and such an alternative automatic control system will be described later. Likewise, instead of the three separate water-level control chambers shown, a single chamber of sufficient vertical length may be provided, with pairs of probe rods inserted at the desired levels.

In Fig. 1 it will be noted that the electrodes 24 and 25 are each formed with an upper section A of greatest diameter, a tapering intermediate section B, and a further tapered bottom section C. The interfacial spacing, or distance apart, of the two electrodes, and thus the length of the current-paths between the upper sections A of the electrodes is represented by X. The average of the corresponding interfacial spacing and length of current-paths at the intermediate section B is represented by Y, and the average for the bottom sections C by Z.

Thus, starting with a cold boiler, by holding the operating water-level near the top of the upper sections A of the electrodes 24 and 25 during the warm-up period, and also during the period prior to such concentration of the water that this proximity and extensive immersion and surface of the electrodes will not overload the electrical supply system, and then subsequently lowering the operating water-levels as the conductivity of the water increases, it will be apparent that not only will an electrical overload be prevented, but also that the current density on the electrodes will be prevented from exceeding the maximum value for which they were designed. In this way the warm-up period of the boiler will be greatly decreased but subsequent current overloading will be prevented, and, with gradually lowered operating water-levels, a longer period of satisfactory operation will be possible notwithstanding the increasing conductivity of the boiler water with elapsed time of operation.

Various modified forms of tapered electrodes may be employed in the carrying out of my invention. One modified form is shown by the electrode 50 in Fig. 2, by way of example. The electrodes, instead of having continuously tapered surfaces, may be stepped, as illustrated by the electrode 52 in Fig. 3. The electrodes may be solid or hollow, and if the latter, may be provided with access openings (such as shown at 51 in Fig. 1), in their surfaces, in order to provide paths of low resistance from the exterior ambient liquid, through such openings, to the interior surfaces of the electrodes, thus making such surfaces effective, electrically.

To a limited extent it is also possible to employ customary electrodes, of uniform diameter throughout their entire extent, in carrying out my invention, by arranging them in non-parallel position so that their distances apart, or interfacial distances, will increase towards the lower end of the boiler. In Figs. 4 and 5 the electrodes 53, 54 and 55, which are of customary uniform diameter, are so arranged in the boiler 56 that the current furnished from the three-phase supply system to which they are connected, will traverse current paths of increasing length, and consequently increasing resistance, as the operating water-level of the boiler is lowered. Thus, although the surface area of such electrodes is constant per unit of length, so also, with proper placement of such electrodes, will the current density thereon remain constant, because the increasing resistance of the current path due to its increasing length will be neutralized by the decreasing specific resistance of the water with increasing concentration.

In the embodiment of my invention illustrated in Fig. 1 I have shown a manually-operated means for controlling and adjusting the desired operating water-level in the generating tube 10, to correspond to the various conductivities of the boiler water. If desired, automatic means, responsive to changes in the water conductivity, can be substituted for the manually-operated means. Such automatic means is illustrated in principle in Fig. 6.

Referring briefly to Fig. 6, a T-fitting 57 is provided in the bottom boiler pipe 12 and a probe rod 58 passes through an insulated bushing 59 and extends into the liquid in the pipe 12. A step-down transformer 60, or an equivalent device, which is supplied from an A. C. circuit 61, is connected in the circuit formed by the probe rod 58, wire 62, transformer 60, relays 63, 64 and 65, wire 66, and the liquid in the pipe 12. It will be evident that as the conductivity of the liquid in the pipe 12 increases, the current through this circuit will also increase. The impedances of the relays 63, 64 and 65 differ from each other in such manner that relay 63 will operate with a slight increase in current through its windings, relay 64 will operate when it receives a greater current, and relay 65 will require a still greater current for its operation. The contacts of these various relays are so arranged that they will consecutively connect the probes in the water-level chambers 31, 34 and 37, through their corresponding wires, to the wires 44 and 45, which in turn connect with the water-level control device 67 (Fig. 7). As previously explained, the mechanism and relays associated with the control device 67 act to close the circuit 68 and 69 to the pump motor when water in a water-level probe chambers 31, 34 and 37, through their correspond- and to open said circuit when the water-level rises to the end of the short probe rod; that is, when current in wire 45 is interrupted, and when current is received through wire 44, respectively. Such contact closures will, therefore, successively connect the high, intermediate and low water probes to the water-level control mechanism, as the conductivity of the boiler fluid increases, and, similarly, disconnect them, when the conductivity decreases, as for example, after the boiler has been blown down and then filled with fresh water.

The above system is therefore capable of exerting the same operative control as the manually operated switch 46 in Fig. 1.

Thus, with my invention, the liquid level for normal operation of the boiler or heater can be either manually or automatically adjusted to correspond to the increase in conductivity taking place in the liquid during the boiler or heater operation, and simultaneously the operation of the boiler or heater will be maintained at the desired power input, and with desired current density on the specially shaped or specially arranged electrodes. Both of these improvements combine to produce greater operating stability and to prevent overloads and excessive swings in power input, and thus carry out the objects of my invention.

I claim:

1. In combination with an electrode liquid heater, means for adjusting the operating level of the liquid in said heater to a plurality of successively lower levels as said liquid develops increased conductivity, said means including a plurality of liquid-level chambers connected with said heater and positioned at different levels, and separate electric elements in each chamber connectable to an electric circuit arranged to cause operation of water-delivery mechanism for said heater.

2. In combination with an electrode liquid heater, means for adjusting the operating level of the liquid in said heater to a plurality of successively lower levels as said liquid develops increased conductivity, said means including a plurality of liquid-level chambers connected with said heater and positioned at different levels, separate electric elements in each chamber connectable to an electric circuit arranged to cause operation of water-delivery mechanism for said heater, and a manually-operated switch in said means for connecting said chambers selectively into said electric circuit.

3. In combination with an electrode liquid heater, means for adjusting the operating level of the liquid in said heater to a plurality of successively lower levels as said liquid develops increased conductivity, said means including a plurality of liquid-level chambers connected with said heater and positioned at different levels, separate electric elements in each chamber connectable to an electric circuit arranged to cause operation of water-delivery mechanism for said heater, and automatic means, responsive to changes in the conductivity of the liquid in said heater, for controlling the operation of said first mentioned means, said automatic means including a circuit through the liquid of said heater, whereby the conductivity of said liquid will govern the amount of current in said latter mentioned circuit, and relays of different impedances operated by said latter mentioned circuit and governing the control operation exerted by said chamber elements.

4. In an electrode boiler of the character described, manually-operated means for adjusting the operating level of the liquid in said boiler to a plurality of successively lower levels as said liquid develops increased conductivity, said means including a plurality of liquid-level chambers connected with said boiler and positioned at different levels, separate electric elements in each chamber connectable to an electric circuit arranged to cause operation of water-delivery mechanism for said boiler, and a manually-operated switch in said means for connecting said chambers selectively into said electric circuit.

5. In an electrode boiler of the character described, automatic means for adjusting the operating level of the liquid in said boiler to a plurality of successively lower levels as said liquid develops increased conductivity, said means including a plurality of liquid-level chambers connected with said boiler and positioned at different levels, separate electric elements in each chamber connectable to an electric circuit arranged to cause operation of water-delivery mechanism for said boiler, and automatic means, responsive to changes in the conductivity of the liquid in said boiler, for controlling the operation of said first mentioned means, said automatic means including a circuit through said boiler liquid, whereby the conductivity of said liquid will govern the amount of current in said latter mentioned circuit, and relays of different impedances operated by said latter mentioned circuit and governing the control operation exerted by said chamber elements.

6. In an electrode boiler of the character described, the combination of a plurality of spaced electrodes in contact with the water in said boiler, the diameters of said electrodes being smaller at the bottom than at the top, and manually-operated means for lowering the operating water-level in said boiler in contact with said electrodes as said water becomes increasingly conductive, said means including a plurality of liquid-level chambers connected with said heater and positioned at different levels, and separate electric elements in each chamber connectable to an electric circuit arranged to cause operation of water-delivery mechanism for said heater.

RALPH W. LOHMAN.

REFERENCES CITED

The following references are of record in the file of this patent:

UNITED STATES PATENTS

| Number | Name | Date |
| --- | --- | --- |
| 1,513,250 | Kaelin | Oct. 28, 1924 |
| 1,597,362 | Henriksson | Aug. 24, 1926 |
| 1,665,793 | Sandborgh | Apr. 10, 1928 |
| 1,744,505 | Robinson | Jan. 21, 1930 |
| 2,050,607 | Hallman | Aug. 11, 1936 |
| 2,185,786 | Eaton | Jan. 2, 1940 |